Feb. 2, 1926.  
J. B. VAN DEREN  
AUTOMATIC WEIGHING MACHINE  
Filed August 10, 1920  3 Sheets-Sheet 1
1,571,460
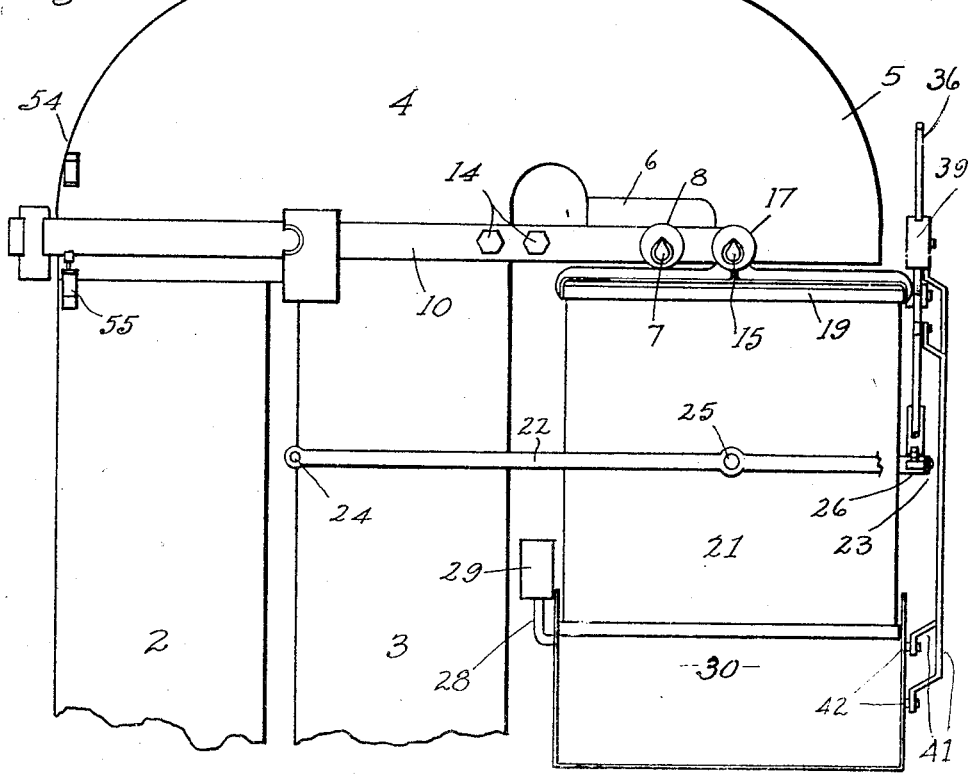
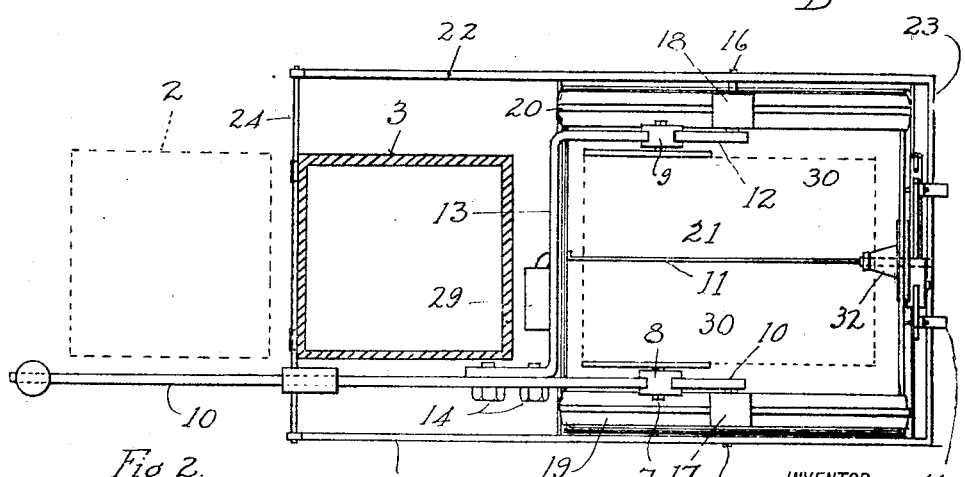
INVENTOR  
James B. Van Deren  
BY  
U. G. Charles  
ATTORNEY Feb 2, 1926.
J. B. VAN DEREN
1,571,460
AUTOMATIC WEIGHING MACHINE
Filed August 10, 1920      3 Sheets-Sheet 2
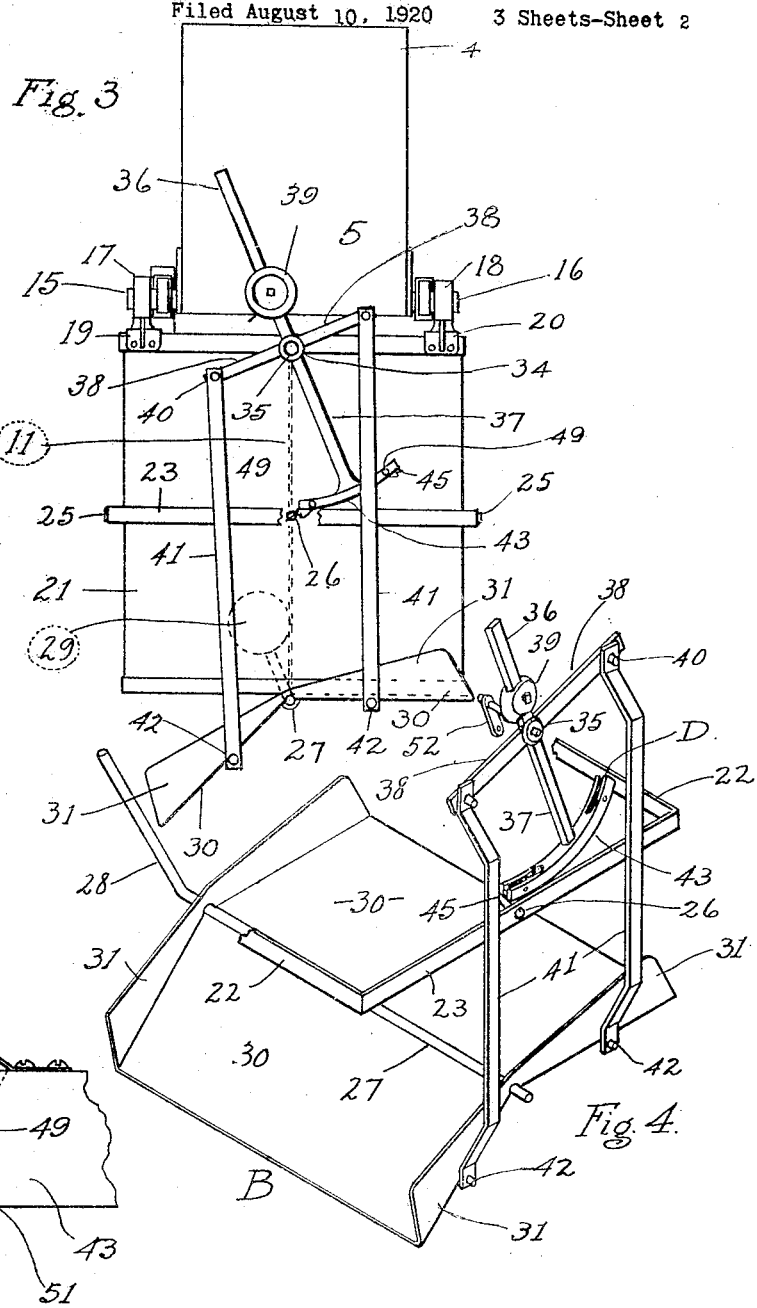
INVENTOR
James B. Van Deren
BY U.G.Charles
ATTORNEY

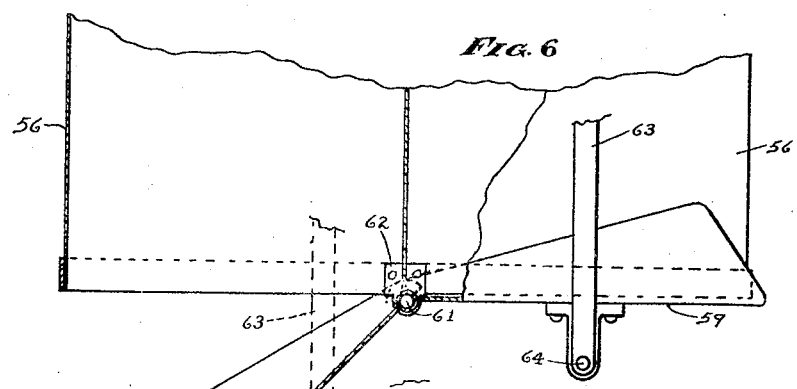
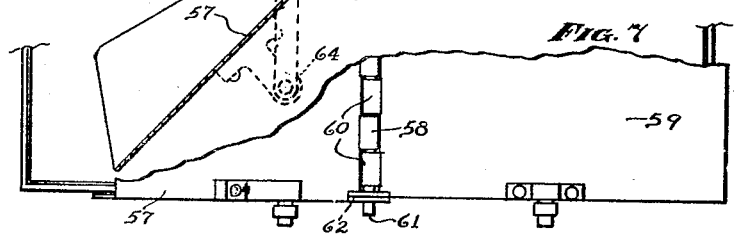
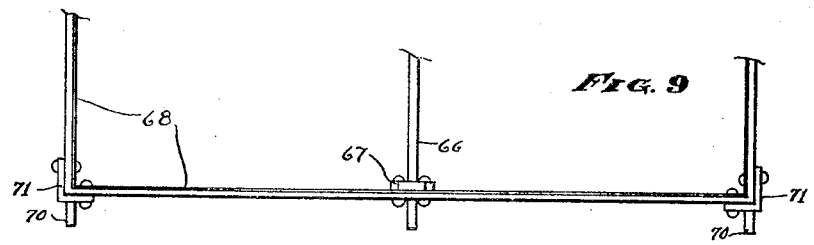
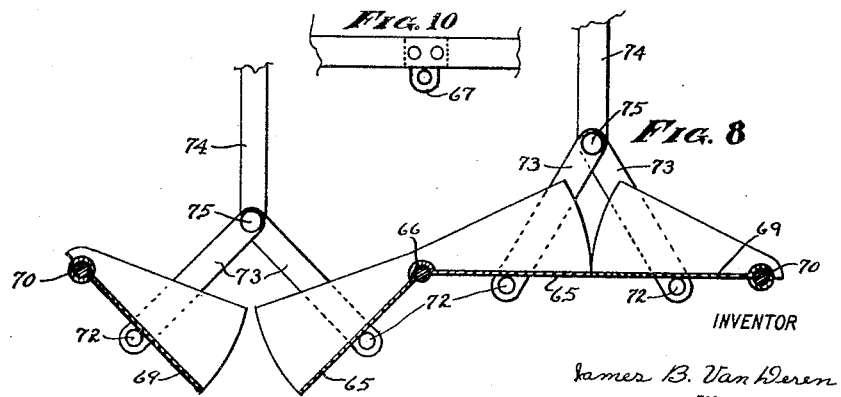

Patented Feb. 2, 1926.

1,571,460

UNITED STATES PATENT OFFICE.

JAMES B. VAN DEREN, OF HENNESSEY, OKLAHOMA.

AUTOMATIC WEIGHING MACHINE.

Application filed August 10, 1920. Serial No. 402,619.

*To all whom it may concern:*

Be it known that I, JAMES B. VAN DEREN, a citizen of the United States, and a resident of Hennessey, in the county of Kingfisher and State of Oklahoma, have invented a certain new and useful Automatic Weighing Machine, of which the following is a specification.

My invention relates to automatic machines for weighing a predetermined quantity of granular material as received from an elevator or a bin, and discharge the measured quantity into sacks or other receptacles.

The general object of the invention is to provide a machine that shall be very accurate in its weighing and trip-control, and to this end the construction is such as to eliminate friction as far as consistent with moderate cost of manufacture.

The invention will be better understood from reference to the accompanying drawings, in which corresponding numerals refer to corresponding parts thruout, and in which:—

Fig. 1 is a side elevation, with parts broken away, of my improved apparatus attached to a grain elevator; Fig. 2 is a top plan view of the machine, one leg of the elevator being shown in section and the head of the elevator omitted; Fig. 3 is a side view of the trip and discharging mechanism, the feed-pan being in one of the discharging positions; Fig. 4 is a perspective view of the trip and discharge mechanism, omitting weight 39 and the U shaped lever 22 being broken away; Fig. 5 is a detail view of one of the trip detents and its mounting. Fig. 6 illustrates a modification, partly in elevation and partly in plan; Fig. 7 is a fragmentary bottom plan view of some of the parts of Fig. 6; Fig. 8 is a side elevation of another modification, the feed-pans being in section; Fig. 9 is a bottom plan view of a portion of a housing and one set of pivots supported thereby, omitting the feed-pans of Fig. 8; and Fig. 10 is a detail view of the central pivot-bearing.

On Fig. 1, the portion of the elevator shown comprises the legs 2, 3 and the head 4, the latter including the usual depending spout 5.

Metal plates 6 secured to the spout 5 are provided with knife-edge pivots 7 which support bearing rings 8, 9 on a scale-beam 10 and a companion beam 12, the latter having an offset 13 secured to beam 10 with screws 14.

The ends of beams 10, 12 are provided with knife-edge pivots 15, 16, on which are mounted bearing-rings 17, 18, integral with a pair of castings 19, 20 which are riveted to the top of the sheet-metal receptacle 21 (see Fig. 3); thus said receptacle is supported from the two beams 10, 12. Swinging of the receptacle 21 is prevented by a U shaped lever 22—23, whose ends are pivotally mounted on a horizontal rod or shaft 24, secured to elevator-leg 3. At the center of opposite sides of the receptacle 21, lever arms 22 are connected thereto by pivots 25. The connecting portion 23 of arms 22 stands clear of the receptacle as shown. It is obvious that when the receptacle moves up or down the connecting bar 23 will be moved in the same direction and further than the receptacle moves. The center of said bar 23 carries rigidly an inwardly projecting pin 26, which stops short of the adjacent receptacle wall.

The bottom of the receptacle 21 proper is entirely open. Said receptacle is divided into two equal compartments by a fixed vertical partition 11 (shown in plan on Fig. 2) secured to the walls thereof.

Supported by bearings (not shown) on the bottom of receptacle 21 is a horizontal rock-shaft 27 having an upturned end 28 on which is a weight 29. Fixedly mounted on rock-shaft 27 is an oscillating feed-pan B, made preferably from a single sheet of metal. The bottom of the feed-pan is formed in two symmetrical halves 30, disposed in planes having a relative angle. Each half is provided with a pair of upstanding flanges 31, which lie outside of and close to the bottom of receptacle 21 but not in contact therewith. The weight 29 on arm 28 tends to hold either half of the pan up against the receptacle (Fig. 3), in which position either half of the pan will form a grain-tight bottom closure for the overlying chamber of the receptacle.

Secured to the inner wall at one upper corner of partition 11 is a bearing 32 for a short rock-shaft 34 which extends out through the receptacle wall to receive the hub 35 of a cross-shaped lever 36—37—38. The upper arm 36 of this lever bears a counterweight 39. The transverse arms 38, 38 are respectively connected by pivot-pins 40 to a pair of depending links 41, which are connected to the respective halves of the feed-pan B by pivot-pins 42. The depending arm 37 carries an arcuate bar 43 or detent-carrier, which extends symmetrically in opposite directions from said arm. In each end of the part 43 is cut a vertical slot 44 in which is inserted a detent D comprising an end stop 45, an emergency stop 46, and a finger 47 upon which bears a spring 48 secured to bar 43. The detent is movably held in place by a pivot-pin 49 passing through detent and bar 43. The lower portion of the detent will yield outwardly, while its inward motion is limited by a shoulder 50 abutting the part marked 51. These two detents D are duplicates and are each adjusted so that when the feed-pan is at either end of its travel one of the detents will engage the stop-pin 26, as shown, in all positions of the receptacle vertically except the lowest: at which time the pin 26 will be moved down past the detent, thereby releasing the cross-lever, the links and the feed-pan.

The grain from the elevator is delivered to opposite sides alternately of partition 11 by an oscillated hopper (not shown) in spout 5; said hopper being actuated through the medium of a rod, etc., from a rock-arm 52 (Fig. 4) on shaft 34. The grain will thus be fed upon either half of the feed-pan B until the predetermined weight of grain is in the receptacle; then the receptacle will descend far enough to drop the stop-pin 26 clear of the detent which has been held pressed against it. The closed half of the feed-pan then drops and the contents of the half of the receptacle are discharged from said half of the pan by gravity. Simultaneously, the other half of the pan is raised to closed position, and the oscillated hopper (not shown) shifted to deliver material to the other chamber of the receptacle.

While the receptacle 21 is discharging it of course ascends—the reason being obvious—and during this upward motion the trip-bar and stop pin or trip-pin 26 are raised relatively to the arcuate arm 43, and said pin moves up against the end 45 of the detent adjacent, if the upper half of the feed-pan be fully closed. If, however, said half should be held slightly open by seeds of grain or any other particle, the pin 26 will engage the emergency shoulder 46 instead. In either case the pin will hold the detent-carrier 43 to one side, thereby holding the feed-pan in proper position until it is tripped by the aforesaid downward motion of the receptacle.

The detents are made yieldable in one direction in order that either detent may disengage itself from pin 26 under certain accidental conditions, not necessary to describe herein.

This weighing-machine has been thoroly tested and has been found to excel in accuracy any other weighing machine which I have similarly tested.

The construction of the oscillating feed-pan herein described may be modified in several respects, without sacrificing any of the advantages attaching to the form shown or to the machine as a whole.

For example, the feed-pan may be constructed in two separate equal parts, as I have represented in Figs. 6 and 7. Part 57 is formed with spaced hinge-sleeves 58, and part 59, with alternating hinge-sleeves 60, all being mounted on a rod 61 held by fixed bearings 62. The links 63 correspond with links 41 of Fig. 3, and operate in the same manner. The pivots 64 are set farther below the pans than in the said Fig. 3.

Still another practicable construction is shown by Figs. 8, 9 and 10. In Fig. 8, each half of the oscillating feed-pan is made in two sections, although the inner sections of the two may be made integral, as is shown. Or, the inner halves 65 of the two pairs of pan sections may be separate. In either case the horizontal rod 66, supported in bearings 67 on the receptacle 68, forms the central pivot upon which the parts 65 are oscillated. The outer quarters, 69, are made separate from the inner quarters, and are pivoted on studs 70 held by lugs 71 riveted to the bottom band of the receptacle 68. The four pivots 72 are supposed to be attached to the bottoms 65, 69 with suitable bearings and at equal distances from the main pivots 66, 70. The pivots 72 of each half are connected to a pair of toggle links 73, and each pair of the latter is connected at upper ends to the lower end of a vertical link 74 by pivot-pins 75. The operation of the whole will be perceived without further description.

Having thus described my invention, what I claim, and desire to secure by Letters Patent, is:

1. In combination, a receptacle divided into two equal chambers, an oscillating feed-pan centrally pivoted to the bottom of the receptacle and comprising halves inclined at an angle to each other; an oscillating weighted arm mounted upon one side of the receptacle; and links connecting said arm with respective sides of said feed-pan.

2. In combination, a receptacle suspended from a scale-beam, a U-shaped lever pivoted near one side of the receptacle and extending horizontally around three sides of the latter; aligned pivotal connections between the parallel arms of said lever and the adjacent walls of the receptacle, a stop-pin held by the central portion of said lever, an oscillating arm mounted upon the receptacle, a pair of detents carried by the oscillating arm, an oscillating feed-pan centrally pivoted to the bottom of the receptacle and comprising halves inclined at an angle each to each, and means actuated by said feed-pan to actuate said detent-carrying arm, for the purpose specified.

3. In an automatic weigher, a receptacle divided into two equal chambers, an oscillating feed-pan centrally pivoted to the bottom of the receptacle and comprising halves inclined at an agle to each other, a rocker-shaft, a cross-shaped lever including a rocker-arm 37 on said shaft, link means pivotally connecting between said lever and the feed-pan, a crossbar 43 on said rocker-arm, detents in both ends of said bar, adapted to engage with any suitable trip-device, and an arm 52 rigidly attached on said shaft and adapted to operate any suitable hopper or deflector.

4. In an automatic weigher, a scale beam, a receptacle suspended from said scale-beam, a U-shaped lever pivoted near one side of the receptacle and extending horizontally around three sides of the same, a stop-pin held by the central portion of said lever, a rocker-shaft, a rocker-arm on said shaft, a crossbar having detents in both ends thereof and adapted to engage said stop-pin, an oscillating feed-pan centrally pivoted to the bottom of said receptacle and comprising halves inclined at an angle to each other, and means actuated by said feed-pan to actuate said detent-carrying arm for the purpose specified.

5. A duplex feed-pan construction, comprising a central pivot-rod, an integral balanced pan-member 65 mounted on said rod, each half of said member providing one half of a duplex construction, pivot-rods 70, equally spaced in opposite directions from said central rod, outer half-pan members 69 pivoted on said rods respectively, a vertically extending link 74 disposed at the meeting ends of each pair of pan members 65—69, toggle-links 73 pivotally supporting said pan members from each of said links, and means for actuating said links oppositely and simultaneously.

6. In an automatic weighing machine, a container having two compartments, feed pans for controlling the discharge openings of said compartments said feed pans being pivoted near the dividing partition of said container, a rocker pivotally mounted above the plane of said feed pans and links connected to respective sides of said rocker and to said feed pans respectively at points below the plane of the pivots of the feed pans.

7. In an automatic weighing machine, a container having two compartments, a centrally pivoted feed pan having wings at an angle to each other, a pivotally mounted rock lever, power transmitting means connecting said pan to said lever and a trip lever pivotally connected to said container and to a relatively stationary object and operable by downward and upward movement of the container, to lock and unlock the feed pan.

JAMES B. VAN DEREN.